UNITED STATES PATENT OFFICE.

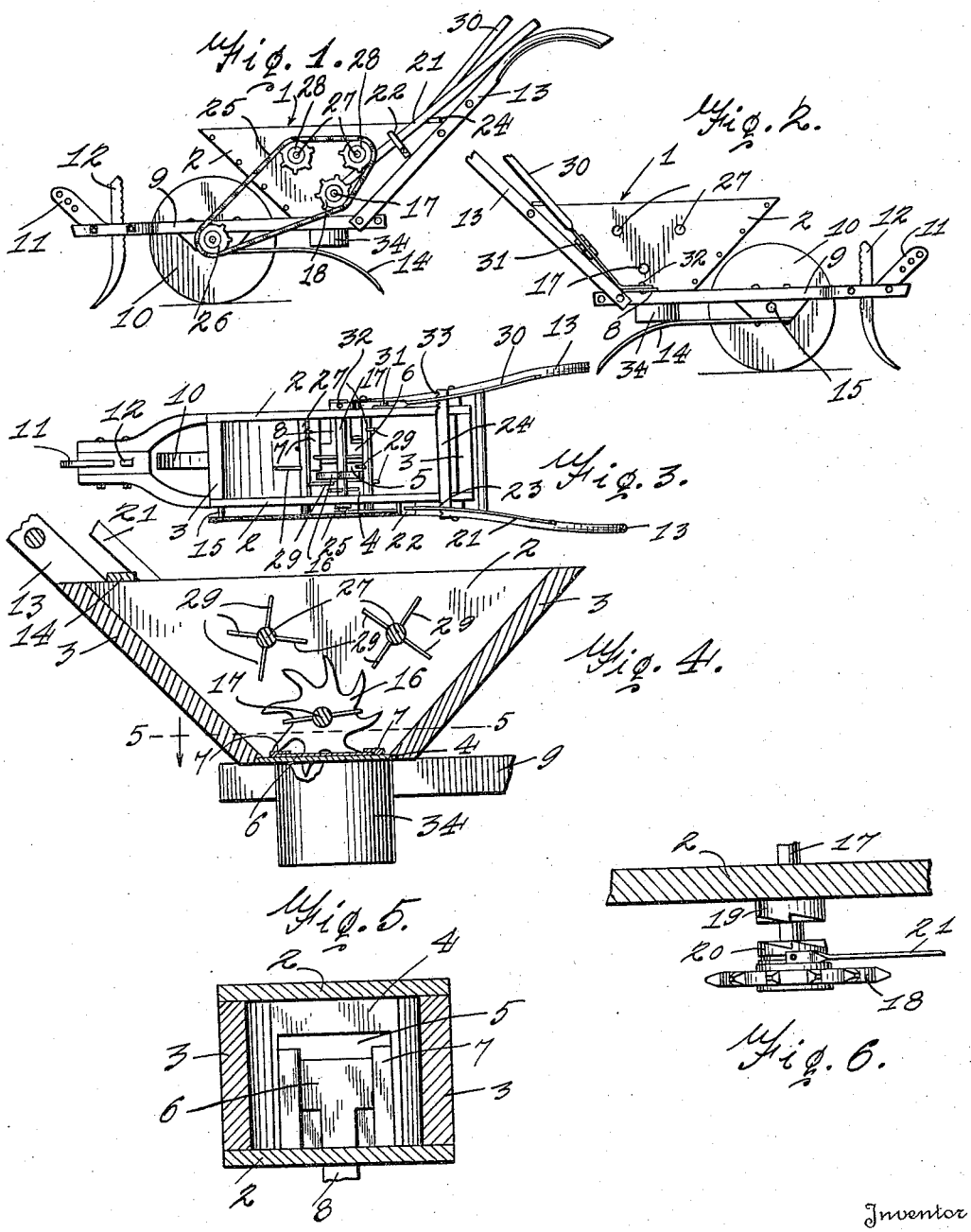

HENRY CRENSHAW, OF BARNETT, GEORGIA, ASSIGNOR OF ONE-HALF TO LAWRENCE R. BROWN, OF SHARON, GEORGIA.

COTTON-PLANTER.

1,179,285.  Specification of Letters Patent. Patented Apr. 11, 1916.

Application filed April 12, 1915. Serial No. 20,841.

*To all whom it may concern:*

Be it known that I, HENRY CRENSHAW, a citizen of the United States, residing at Barnett, in the county of Warren, State of Georgia, have invented certain new and useful Improvements in Cotton-Planters; and I do hereby declare the following to be a full, clear, and exact description of the invention, such as will enable others skilled in the art to which it appertains to make and use the same.

This invention relates to a cotton planter.

An object of the invention resides in the provision of a device of this character by means of which cotton seeds may be planted.

A further object of the invention resides in so constructing the device that the seeds will be fed from the hopper, automatically, during the movement of the device.

A further object of the invention resides in so constructing the device that the feed may be regulated.

A still further object of the invention resides in the provision of means for rendering the feed wheel inoperative so that the device may be advanced without the seed being fed therefrom.

With these and other objects in view, such as will appear as the description progresses, my invention comprises the combination and arrangement of parts as set forth in and falling within the scope of the appended claim.

Referring to the drawing: Figure 1 is a side elevation of my device, showing the operating mechanism for the feed wheel and the agitators. Fig. 2 is a similar view looking at the opposite side of the device. Fig. 3 is a plan view. Fig. 4 is a vertical sectional view, showing the feed wheel and the agitators. Fig. 5 is a horizontal sectional view, showing the feed opening and the slide for varying the size of the same. Fig. 6 is a fragmental view, showing the manner of clutching the drive sprocket for the feed wheel to the shaft.

Referring to the drawing wherein like parts are indicated by like characters throughout the several views: In the embodiment of my invention shown in the drawing, I have provided a hopper 1 which has straight side walls 2 and inclined front and rear walls 3. The bottom of this hopper is formed by a plate 4 having a feed opening 5 therein, the size of which may be varied by a slide 6, which is operable between guides 7 and has a tongue 8 extending outwardly through one of the side walls. This hopper 1 is mounted on a frame 9, which frame is supported by a wheel 10. On the forward end of this frame is formed a draft bar 11. Secured to this forward end is a plow 12 located directly in front of the wheel 10. Secured to the frame 9 and to the sides of the hopper 1 are handles 13 by means of which the device may be moved.

In order that the furrow formed by the plow 12 may be covered, I have provided a pair of blades 14 which are secured to the frame 9 at a point adjacent the axle 15 of the wheel 10. These blades extend rearwardly and their ends are turned downwardly, as clearly shown in Fig. 1 of the drawing.

In order that the seed may be fed from the hopper 1, I have provided a toothed feed wheel 16 which is mounted on a shaft 17 extending between and rotatably mounted in the opposite sides of the hopper. This wheel projects downwardly through the feed opening 5. One end of the axle 17 projects outwardly from one side of the hopper 1 and has a sprocket 18 mounted thereon. In order that this sprocket may be clutched to the shaft 17, I have provided clutch members 19 and 20, the member 19 being secured to the shaft 17 and the member 20 rigid with the sprocket 18, with which it is slidable on the shaft 17. In order that these clutch members 19 and 20 may be caused to engage, I have provided a control lever 21 which is engaged with the clutch member 20, is pivoted in a bracket 22 and has a handle portion extending upwardly to a point adjacent one of the handles 13. This lever may be shifted so as to cause the clutch members 19 and 20 to engage or disengage. The lever is maintained in any of its adjusted positions by its engagement with one of a plurality of notches 23 formed in a cross bar 24 which extends transversely of and is secured to the upper edges of the hopper. A chain 25 passes over this sprocket 18 and over a sprocket 26 secured to the axle 15 so that when the wheel 10 is revolved the feed wheel 16 will be likewise revolved, that is, when the clutch members 19 and 20 are engaged.

In order that the seed within the hopper 1 may be agitated, I have provided transversely extending shafts 27 which are mounted in the sides of the hopper and have their ends extending beyond one side thereof. Secured to these extended ends are sprockets 28 over which the chain 25 passes. Extending radially from these shafts 27 and the shaft 17 are agitator fingers 29 by means of which the seeds are stirred within the hopper during the advance of the device.

In order that the slide 6 may be moved in the guides 7 to vary the size of the feed opening 5, I have provided a lever 30 which is pivoted, at 31, to the side of the hopper 1 and has its lower end connected, at 32, to the extending tongue 8 of the slide 6. This lever 30 extends upwardly and has a handle portion adjacent one of the handles 13. The adjacent end of the cross bar 24 is provided with notches 33 in any one of which the lever 30 is adapted to engage to maintain the slide 6 in its adjusted position, the lever being held in the notch by virtue of its resiliency.

As the device is pushed forwardly a furrow will be formed by the plow 12, the seeds will be agitated within the hopper 1 and fed through the opening 5 by the wheel 16, at which time they will drop into the furrow. These seeds are guided by a downwardly extending spout 34 which is in alinement with the opening 5. After the seeds are dropped into the furrow they are covered by the blades 14. When it is desirable to push the device without feeding seed therefrom the slide 6 may be moved to close the opening 5 and the clutch members 19 and 20 disengaged, at which time the wheel 16 will remain stationary.

It will thus be seen that I have provided a cotton planter by means of which the seed may be dropped into the furrow and covered and I have so constructed the device that when it is desirable to transport the device without feeding the seed therefrom the feed wheel may be rendered inoperative.

It is obvious that the device may be used for planting various kinds of seeds and I have merely mentioned the planting of cotton seeds because it is particularly adapted for planting the same.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claim.

What I claim is:—

In a seed planter, the combination with a wheel supported hopper, of a shaft extending transversely thereof, a plurality of agitator fingers on said shaft, a feed wheel of lesser width than the hopper on the shaft, a plurality of agitators mounted above the shaft, common means for simultaneously driving the said shaft to actuate the feed wheel, and agitator fingers thereon and the last mentioned agitators, means for rendering the feed wheel and agitator fingers on the shaft inoperative independently of the last mentioned agitators.

In testimony whereof, I affix my signature, in the presence of two witnesses.

his
HENRY  X  CRENSHAW.
              mark

Witnesses:
JNO. T. SCRUGGS,
F. L. HOWELL.